United States Patent [19]

Petersen et al.

[11] Patent Number: 5,465,615
[45] Date of Patent: Nov. 14, 1995

[54] LOADING ASSEMBLY FOR A VEHICLE SPINDLE TEST FIXTURE

[75] Inventors: Niel R. Petersen; Paul S. Petersen; Joseph W. Daley, all of Minnetonka, Minn.

[73] Assignee: MTS Systems Corporation, Eden Prairie, Minn.

[21] Appl. No.: 234,138

[22] Filed: Apr. 28, 1994

[51] Int. Cl.⁶ .................. G01H 1/00; G01M 19/00
[52] U.S. Cl. ................. 73/118.1; 73/669; 73/865.9
[58] Field of Search ................. 73/118.1, 865.3, 73/865.6, 865.9, 669, 798

[56] References Cited

U.S. PATENT DOCUMENTS

| | | | |
|---|---|---|---|
| 3,028,761 | 4/1962 | Cole, Jr. | 74/68 |
| 3,713,330 | 1/1973 | Lentz | 73/93 |
| 4,016,754 | 4/1977 | Wiss | 73/865.9 |
| 4,133,201 | 1/1979 | Klinger | 73/865.9 |
| 4,263,809 | 4/1981 | Petersen et al. | 73/118.1 |
| 4,501,139 | 2/1985 | Petersen | 73/865.9 |
| 4,567,782 | 2/1986 | Speicher et al. | 74/96 |
| 4,658,656 | 4/1987 | Haeg | 73/669 |
| 4,733,558 | 3/1988 | Grenier | 73/118.1 |
| 4,977,791 | 12/1990 | Erichsen | 74/96 |
| 4,981,034 | 1/1991 | Haeg | 73/669 |
| 5,083,453 | 1/1992 | Daley | 73/118.1 |
| 5,088,320 | 2/1992 | Fukuda et al. | 73/118.1 |
| 5,131,267 | 7/1992 | Fukuda et al. | 73/118.1 |
| 5,241,856 | 9/1993 | Petersen et al. | 73/118.1 |

Primary Examiner—Richard Chilcot
Assistant Examiner—George Dombroske
Attorney, Agent, or Firm—Westman, Champlin & Kelly

[57] ABSTRACT

A loading assembly that permits a lateral force to be applied parallel to an axis of a vehicle spindle includes a support frame and a wheel adapter housing mounted to the vehicle spindle. A loading member is pivotally joined to the support frame at a position spaced apart from the wheel adapter housing on the axis of the spindle. A plurality of spaced apart struts connects the loading member to the wheel adapter housing. An actuator applies a selected force to the loading member, which is transferred as a lateral force to the vehicle spindle. In a first embodiment, an adjustable coupling is provided between the actuator and the loading member to emulate a rolling radius of a tire assembly mounted to the vehicle spindle. In a second embodiment, a second loading member is operably connected to the first-mentioned loading member. A second actuator applies a force to the second loading member to apply a selected moment to the vehicle spindle.

22 Claims, 6 Drawing Sheets

LOADING ASSEMBLY FOR A VEHICLE SPINDLE TEST FIXTURE

BACKGROUND OF THE INVENTION

The present invention relates to loading assemblies used for testing portions of a vehicle. More particularly, the present invention relates to a loading assembly for applying a lateral force to a vehicle spindle to emulate the rolling radius of a tire assembly and for applying steer moments and camber moments to the vehicle spindle.

Many test fixtures have been advanced to apply forces and moments to a vehicle spindle in order to simulate driving or road conditions. These test fixtures often include separate actuators to apply substantially independent vertical, longitudinal and lateral forces as well as a braking moments to the vehicle spindle. U.S. Pat. Nos. 4,733,558 and 5,083,453 disclose two such test fixtures.

Commonly, the test fixtures include a wheel adapter housing that is mounted to the vehicle spindle. Two vertical struts are joined to the perimeter of the wheel adapter housing and are used to transfer the longitudinal forces, the vertical forces and the braking moments to the vehicle spindle. A center downwardly projecting tang located between the vertical struts and also joined to the perimeter of the wheel adapter housing is joined to a lateral strut, which is used to transmit lateral force developed from an actuator.

Although the above-identified test fixtures are quite capable of applying longitudinal forces, vertical forces, lateral forces and braking moments to the vehicle spindle, adaptation of the test fixtures in order to apply either steer moments or camber moments to the vehicle spindle is not easy. For example, severe clearance problems with the vertical struts and/or the vehicle fender well sheet metal are encountered as the braking moment is applied if struts are located far from the perimeter edge of the wheel adapter housing. However, use of a single pivot connection of the lateral strut to the tang is also undesirable since the wheel adapter housing does not accurately emulate the rolling radius of the actual tire assembly that is mounted to the spindle particularly when the spindle is subjected to large vertical displacements.

SUMMARY OF THE INVENTION

A loading assembly that permits a lateral force to be applied parallel to an axis of a vehicle spindle includes a support frame and a wheel adapter housing mounted to the vehicle spindle. A loading member is pivotally joined to the support frame at a position spaced apart from the wheel adapter housing on the axis of the spindle. A plurality of spaced apart struts connects the loading member to the wheel adapter housing. An actuator applies a selected force to the loading member, which is transferred as a lateral force to the vehicle spindle.

In a first embodiment, an adjustable coupling is provided between the actuator and the loading member. Location of the adjustable coupling away from the wheel adapter housing and use of a plurality of struts mounted at the perimeter edge of the wheel adapter housing allows proper emulation and adjustment of the wheel rolling radius without the need for a long tang that can interfere with operation of vertical struts also attached to the wheel adapter housing. In addition, location of the adjustable coupling remote from the wheel adapter housing with the plurality of struts decouples the mass of the adjustable coupling from the wheel adapter housing. Excess mass on the wheel adapter housing is undesirable because it contributes to inaccuracies during simulation.

In a second embodiment, a second loading member is pivotally connected to the support frame and operably connected to the first-mentioned loading member. A second actuator is joined to the second loading member. The second actuator displaces the second loading member so as to displace at least two struts of the plurality of struts in opposed directions so as to apply a moment to the vehicle spindle.

DETAILED DESCRIPTION OF THE PREFERRED EMBODIMENTS

Figure 1:
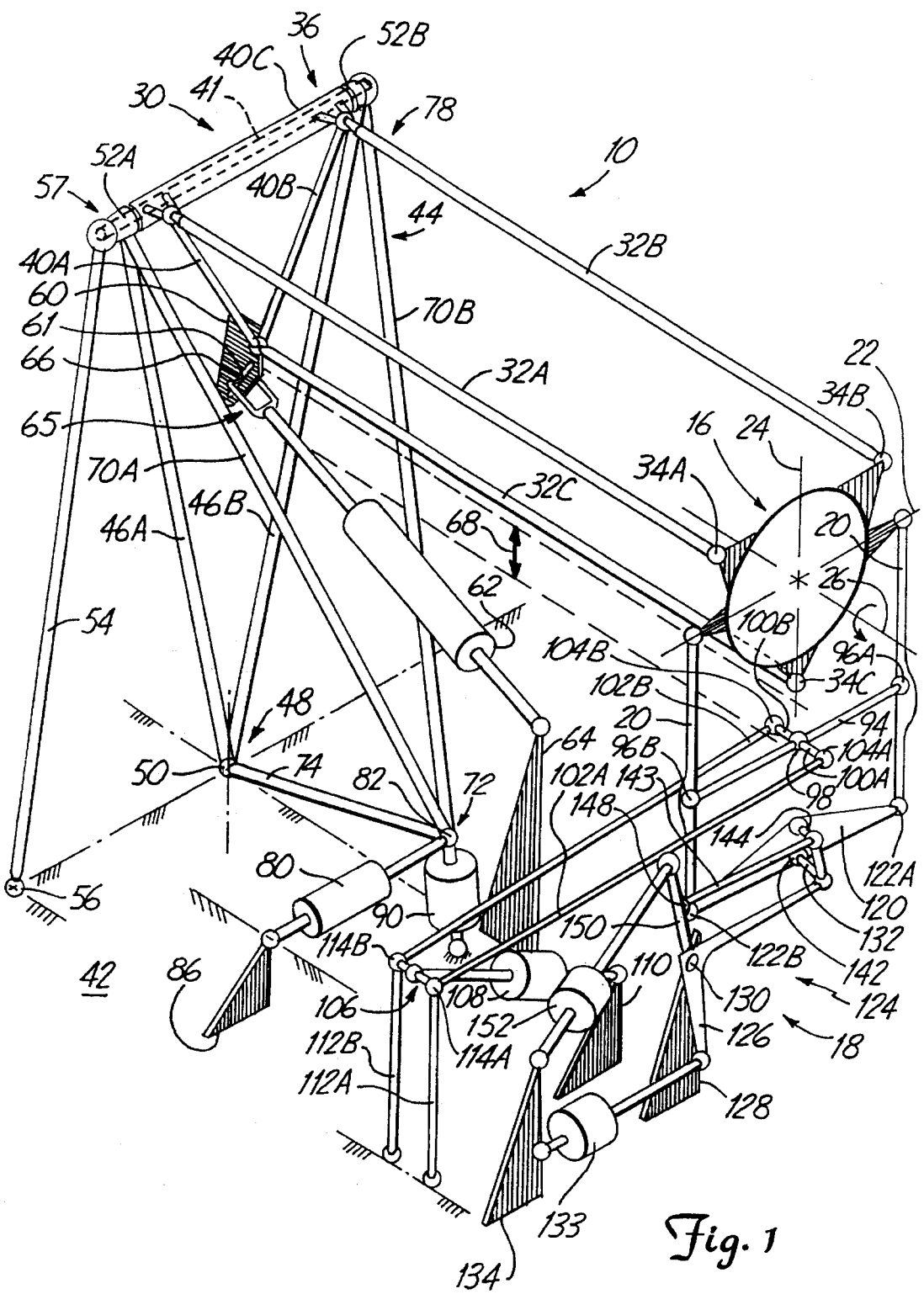
FIG. 1 is a schematic representation of a vehicle spindle test fixture including a loading assembly of the present invention.
Figure 3:
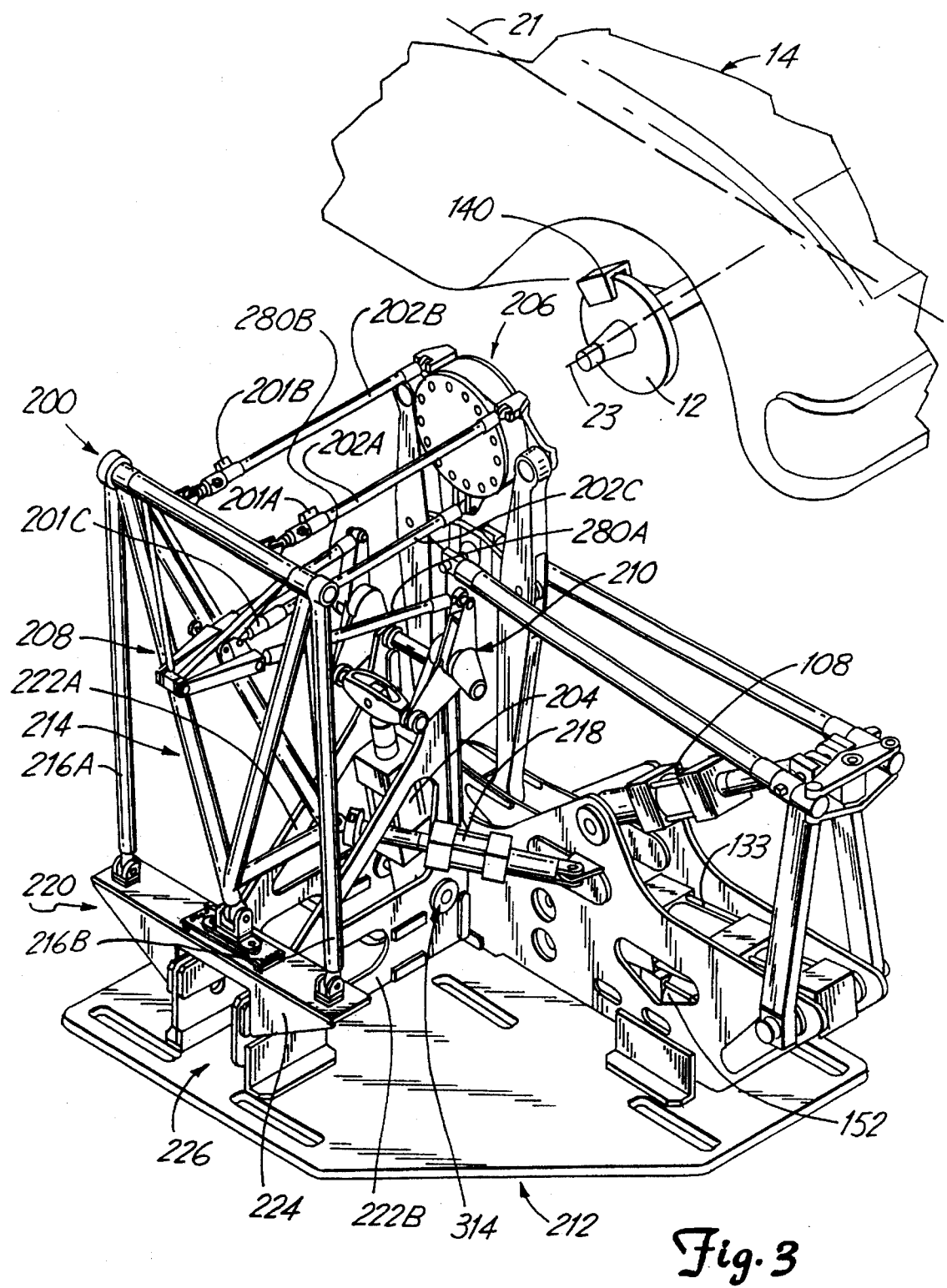
FIG. 3 is a perspective view of the vehicle spindle test fixture including the loading assembly of the present invention.

Referring to FIG. 1 and the schematic representation thereof, a vehicle spindle test fixture is indicated generally at 10 and is designed for applying linear force and rotational moments to a spindle 12 of a vehicle 14, illustrated in FIG. 3. The vehicle spindle test fixture 10 includes a wheel adapter housing 16 that is suitably fixed to the vehicle spindle 12 in a conventional manner. A first loading assembly 18 is joined to the wheel adapter housing 16 using a pair of vertically extending loading links or struts 20. Generally, the first loading assembly 18 applies loads to the wheel adapter housing 16, and thus the spindle 12, in directions along two mutually perpendicular axes 22 and 24. In addition, the first loading assembly 18 applies a moment or torque about an axis 26 that is mutually perpendicular to axes 22 and 24. Although the first loading assembly 18 will be described briefly below, the loading assembly 18 is similar in construction and operation to similar components in the test fixture described in U.S. Pat. No. 5,083,453, which is hereby incorporated by reference.

As used herein, the following definitions for forces and moments about the axes 22, 24 and 26 will apply: a "longitudinal force" is force applied to the wheel adapter housing 16 generally parallel to the axis 22, the axis 22 being parallel to a longitudinal axis 21 of the vehicle 14 (FIG. 3); a "vertical force" is a force to the wheel adapter housing 16 generally along the axis 24; a "lateral force" is a force applied to the wheel adapter housing 16 generally parallel to the axis 26, which is parallel to an axis 23 of the spindle 12 (FIG. 3); a "braking moment" is a moment applied to the wheel adapter housing 16 generally about the axis 26; a "steer moment" is a moment applied to the wheel adapter housing 16 generally about the axis 24; and a "camber moment" is a moment applied to the wheel adapter housing 16 generally about the axis 22.

A second loading assembly 30, constituting a first embodiment of the present invention, applies one or any combination of a lateral force, a steer moment and a camber moment to the wheel adapter housing 16. The second loading assembly 30 includes a plurality of struts, preferably three illustrated at 32A, 32B and 32C. More than three struts can be used if properly attached to the wheel adapter housing 16. Likewise, two struts could also be used placed above and below the spindle axis 23 if a steer moment is not necessary.

The struts 32A through 32C are joined to the wheel adapter housing 16 with spherical bearings 34A, 34B and 34C provided on ends thereof. At ends opposite the wheel adapter housing 16, the struts 32A through 32C are joined to a movable frame assembly or loading member 36. As illustrated, the movable frame assembly 36 includes three rigidly secured supports 40A, 40B and 40C. Preferably, the support 40C is hollow, having a pivot shaft 41 located therein. The support 40C rotates about the pivot shaft 41 thereby allowing pivoting motion of the movable frame assembly 36.

The movable frame assembly 36 and the pivot shaft 41 are supported above a fixed base 42 in part by a second frame assembly or loading member 44. The second frame assembly 44 includes two struts 46A and 46B which are joined together at a first end 48 with a suitable joint such as a Hooke's joint or spherical bearing 50 that is mounted to the fixed base 42. At an end opposite the spherical bearing 50, each of the struts 46A and 46B include a collar 52A and 52B, respectively. The collars 52A and 52B also rotate on the pivot shaft 41. A stabilizing strut 54 serves as a support frame and stabilizes the position of the frame assemblies 36 and 44 during operation yet allows the pivot shaft 41 to twist when necessary. The stabilizing strut 54 includes a suitable joint such as a Hooke's joint or spherical bearing 56 mounted to the base 42 and a simple cylindrical joint 57 secured to the support shaft for movement thereabout. Preferably, as described below with respect to the embodiment of FIG. 3, a second stabilizing strut (not shown) is mounted on an end of the support shaft opposite to the stabilizing strut 54, which in turn, is mounted to the base 42 with another Hooke's joint or spherical bearing.

As stated above, the frame assembly 36 is a rigid body formed by supports 40A, 40B and 40C. A plate member 60 is rigidly connected to struts 40A and 40B and extends downwardly toward the fixed base 42. A dual-acting actuator 62 has a first end connected to a support structure 64 and a second end connected to the plate member 60. Operation of the actuator 62 allows a lateral force to be applied to the wheel adapter housing 16.

In the preferred embodiment, an adjustable pivot connection 65 is provided to connect the actuator 62 to the plate member 60. As embodied in FIG. 1, the adjustable pivot connection 65 includes a slot 66 formed in the plate member 60. A pivot pin 61 extends through the slot 66 and is secured at a selected position. By varying the position of the pivot connection 65 of the actuator 62 to the plate member 60, the rolling radius of many tire assemblies can be emulated by the wheel adapter housing 16. As is commonly known, the rolling radius of a tire assembly is the radial distance from the axis 23 of the spindle 12 to the contact patch of the tire upon a road surface. It is preferable to adjust the rolling radius in order that contact of the tire upon a road surface can be properly simulated. As illustrated, movement of the pivot connection 65 allows the rolling radius to be adjusted a distance shown by double arrow 68.

In the preferred embodiment, the second load assembly 30 further provides a steer moment upon the spindle 12. The steer moment is developed through differential movement of the struts 32A and 32B induced by twisting motion of the frame assemblies 36 and 44. As illustrated, struts 70A and 70B extend from collars 52A and 52B, respectively, being joined together at a remote end 72. An additional strut 74 joins the struts 70A and 70B at end 72 with struts 46A and 46B at end 48. As connected, the struts 46A, 46B, 70A, 70B, 74 and the pivoting strut 40C generally form a open space frame assembly 78 that generally conforms to the shape of a tetrahedron. A dual-acting actuator 80 is mounted at a first end to the converging ends of the struts 70A, 70B and 74 with a spherical bearing 82. The actuator 80 is mounted to a support structure 86.

In a further preferred embodiment, a dual-acting actuator 90 is further joined to the spherical bearing 82 and joined at an opposite end to the fixed base 42. The actuator 90, when operated, causes a pivoting motion of the space frame 78 on the spherical bearing 50. This in turn causes differential movement of the struts 32A and 32B relative to the strut 32C in order to apply the camber moment to the wheel adapter housing 16. By operating the actuator 62 in conjunction with the actuator 90, the camber moment applied to the wheel adapter housing 16 can be adjusted to a position between the simulated contact patch of the tire assembly and the axis 23 of the spindle 12.

As stated above, the vertically extending struts 20 apply forces from the first loading assembly 18. The struts 20 are coupled together in their midportions with a crosslink 94 that has at its opposite ends spherical bearings designated at 96A and 96B. The crosslink 94 has a center spherical bearing 98 with struts 100A and 100B extending therefrom. Each of the struts 100A and 100B is connected to longitudinal struts 102A and 102B, respectively, using spherical bearings 104A and 104B, respectively. A crosslink 106 joins the longitudinal links 102A and 102B together at ends opposite the crosslink 94. A dual-acting actuator 108 joined at a first end to a support structure connected to the crosslink 106. Pivot arms 112A and 112B support the crosslink 106 above the base 42. Spherical bearings 114A and 114B are provided to connect the longitudinal links 102A and 102B to the pivot arms 112A and 112B, respectively. In similar fashion, spherical bearings are also provided for connecting the actuator 108 to the crosslink 106, and connection of the pivot arms 112A and 112B to the support base 42. Operation of the actuator 108 provides a longitudinal force to the wheel adapter housing 16.

The lower end of the vertical loading links 20 are joined with a delta-shaped (triangular) bell crank 120 that is mounted between spherical bearings 122A and 122B of the vertical struts 20. The bell crank 120 is movable in a vertical direction to apply a vertical force to the wheel adapter housing 16 through the struts 20. The bell crank 120 is mounted on a bell crank arm assembly 124. The bell crank arm assembly 124 has an actuating arm portion 126 and is supported by a support structure 128 with a pivot pin 130. The bell crank assembly 124 is joined to the bell crank 120 with a suitable connecting strut 132. A dual-acting actual or 13 connected between a support structure 134 and the actuating portion 126 applies vertical forces to the bell crank assembly 124 which in turn are transmitted to the bell crank 120.

In order to apply a braking moment on the wheel adapter housing 16, it is necessary to put a torque load on the wheel adapter housing 16 when a brake 140 (FIG. 3) is being clamped. The braking moment is applied by pivoting the bell crank 120 about a central spherical pivot 142 in order to cause differential vertical movement of the struts 20. A suitable control link 144 is pivotally connected to the bell crank 120, at a point that is spaced apart from a line passing through spherical bearings 122A and 122B. A link 143 is pivotally mounted as at 148 to an actuator lever 150. The actuator lever 150 has one end pivotally mounted to the support structure 128. A dual-acting actuator 152 connected between the actuator lever 150 and the support structure 134 pivots the actuator lever 150 in order to pivot the bell crank 120 about the center spherical bearing 142. As stated above, the first loading assembly 18 is similar to the corresponding portion of the test fixture described in U.S. Pat. No. 5,083,453. In the embodiment illustrated in FIG. 3, the actuators 108, 133 and 152 are located generally in the same plane. Placement of the actuators 133 and 152 however has been switched with the bell crank assembly 124 and the bell crank 120 being correspondingly inverted, but not shown, since the first loading assembly is not part of the present invention.

An embodiment of the second loading assembly of the present invention is illustrated in FIG. 3 generally at 200. The second loading assembly 200 includes three lateral struts 202A, 202B and 202C which transfer lateral forces from a dual-acting actuator 204 to a wheel adapter housing indicated at 206. The struts 202A through 202C are preferably formed from a graphite composite and are joined to a frame assembly or loading member indicated at 208. The frame assembly 208 in turn is connected to a bell crank assembly indicated at 210. The frame assembly 208 is supported in part above a base 212 by a second frame assembly or loading member 214. Stabilizing struts 216A and 216B serve as a support frame and stabilizes the position of the frame assemblies 208 and 214 during operation yet allow the frame assemblies 208 and 214 to twist when necessary. A dual-acting actuator 218 is joined between the frame assembly 214 and a frame portion 219 of the first loading member 18. The actuator 218 applies a steer moment to the wheel adapter housing 206. Load cells 201A, 201B and 201C are formed in the struts 202A, 202B and 202C to measure loads transmitted therethrough and provide representative electric signals to a controller, not shown, in order to calculate the lateral force, the steer moment and the camber moment on the vehicle spindle 12.

The second loading assembly 200 includes a base portion 220 formed by parallel upstanding support members 222A and 222B. A cross support 224 is secured to the support members 222A and 222B, as illustrated at 226, and provides a stable support base for the frame assembly 214 and the stabilizing struts 216A and 216B.

Figure 2:
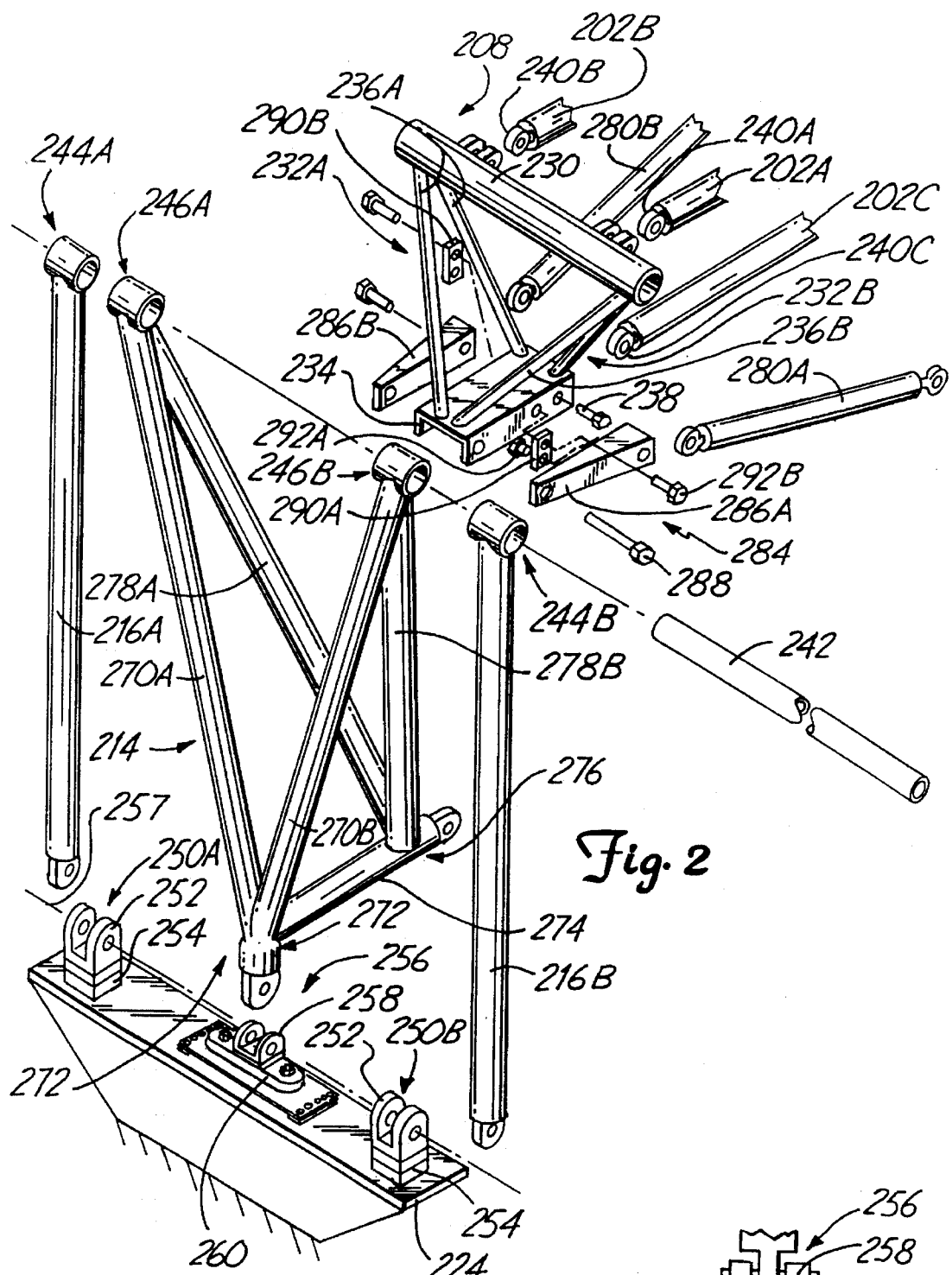
FIG. 2 is a perspective view of a portion of the loading assembly.

The frame assemblies 208 and 214 are illustrated in detail in FIG. 2. The frame assembly 208 includes an upper hollow cylindrical support 230. Strut assemblies 232A and 232B secured at opposite ends to the support 230 rigidly secure a U-shaped support member 234. As illustrated, each of the strut assemblies 232A and 232B include a pair of struts 236A and 236B, respectively. The struts 202A and 202B are joined to the support 230 with pivot pins (not shown). Similarly, the strut 202C is joined to the support member 234 using a pin 238. Preferably, each of the struts 202A through 202C include rotatable rod ends 240A, 240B and 240C to form spherical bearings.

The frame assembly 208 is joined to the frame assembly 214 and the stabilizing struts 216A and 216B using a common support shaft 242. Preferably, the support shaft is cylindrical or hollow in order to reduce mass. Suitable bearings (not shown) provided in the support member 230, ends 244A and 244B of the stabilizing struts 216A and 216B, respectively, and ends 246A and 246B of the frame assembly 214 allow independent pivoting motion of the frame assembly 208, frame assembly 214 and the stabilizing struts 216A and 216B about the support shaft 242.

The stabilizing struts 216A and 216B are joined to the cross support 224 with suitable joints such as Hooke's joints or spherical bearings indicated at 250A and 250B. Preferably, Hooke's joints are used wherein each of the joints 250A and 250B includes a U-shaped support 252 that is pinned to the corresponding stabilizing struts 216A and 216B. The U-shaped supports 252 are each likewise pivotally joined to a support base 254 that is securely fastened to the cross support 224.

Figure 2A:
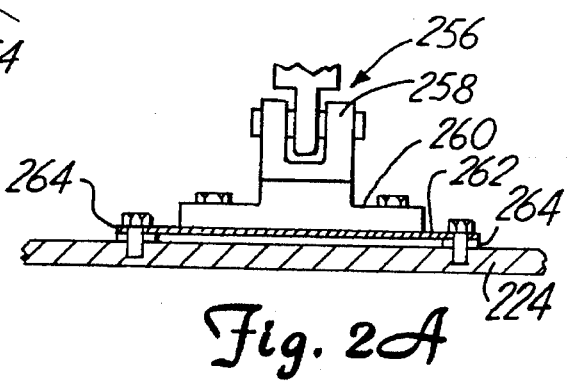
FIG. 2A is a sectional view of a center mount.

A center Hooke's joint 256 is similar to the joints 250A and 250B, and comprises a U-shaped support 258 which in turn is pivotally mounted to a support base 260. Referring also to FIG. 2A, the joint 256 includes a flexible plate member 262 that is joined to the support base 260 above the cross support 224 with spacers 264. The flexible plate member 262 allows limited movement of the joint 256 which is needed during movement of the frame assembly 214. It should be noted that connecting pins for joints 250A, 250B and 256 are generally aligned and lie in a common plane as indicated by a reference line 257.

Preferably, the frame assembly 214 comprises struts 270A and 270B that extend from corresponding ends 246A and 246B and are joined together at an end 272. A strut 274 extends outwardly from the end 272. At an end 276, the strut 274 is attached to the actuator 218 (FIG. 1) with a suitable spherical bearing. Preferably, struts 278A and 278B are also provided and secure the strut 274 at end 276 to the struts 2170A and 270B, respectively, at ends 246A and 246B, respectively. The frame assembly 214 allows pivoting movement of the frame assembly 208 therein.

Referring to FIGS. 2 and 3, the frame assembly 208 is connected to the bell crank assembly 210 with a pair of graphite composite struts indicated at 280A and 280B. As with the schematic illustration of FIG. 1, it is preferable to adjust the pivoting connection of the struts 280A and 280B with the frame assembly 208 in order to emulate the rolling radius or the location of the contact patch of a tire assembly mounted to the spindle 12. Adjustment of the rolling radius is provided by a pivoting assembly 284. The pivoting assembly 284 includes two pivoting arms 286A and 286B. The pivoting arms 286A and 286B are pivotally joined to the U-shaped support member 234 with a pivot pin 288. At ends opposite the pin 288, each of the pivoting arms 286A and 286B are pivotally joined to struts 280A and 280B, respectively. A link 290A is also connected between the pivoting arm 286A and the U-shaped support member 234 with suitable fasteners 292A and 292B. The length of the link 290A thereby adjusts the angular position of the pivoting arm 286A with respect the U-shaped support member 234. A link 290B is similarly connected between the pivoting arm 286B and the support member 234. The links 290A and 290B are of equal length and removed and replaced with links of different length to adjust the rolling radius or the location of the simulated contact patch.

Figure 4:
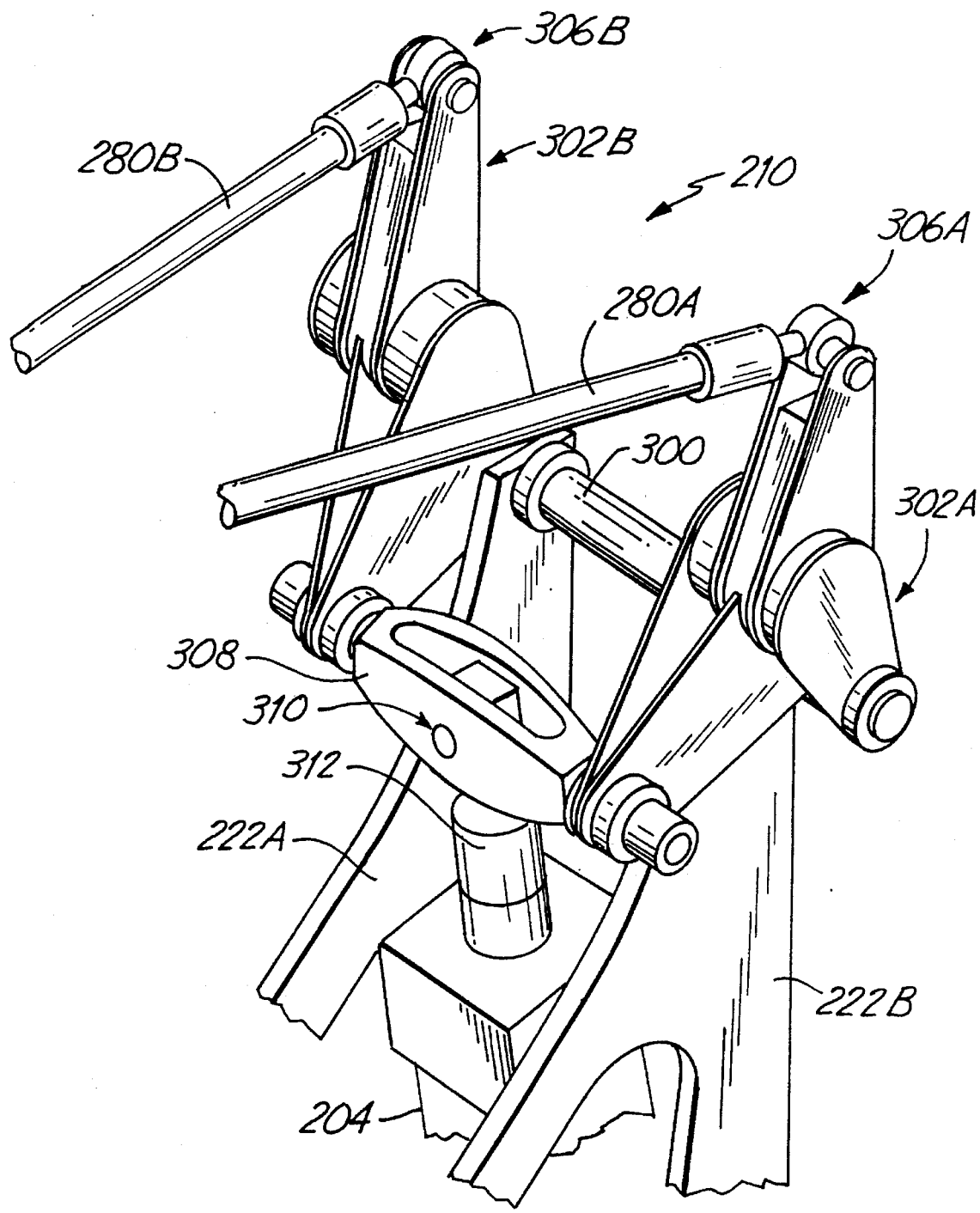
FIG. 4 is an enlarged perspective view of a portion of the loading assembly.

The bell crank assembly 210 is illustrated in FIG. 4. The bell crank assembly includes a pivot shaft 300 pivotally mounted to the support members 222A and 222B. Two bell cranks 302A and 302B are pivotally secured to the pivot shaft 300. The strut 280A is joined to the bell crank 302A, preferably using a spherical bearing at 306A. Similarly, the strut 280B is joined to the bell crank 302B, preferably using a spherical bearing 306B. A cross support 308, being pivotally joined to both bell cranks 302A and 302B, is in turn pivotally connected at a center portion 310 to a rod 312 of the actuator 204. As illustrated in FIG. 3, the actuator 204 is pivotally joined at its base 314 to the support members 222A and 222B.

Figure 5:
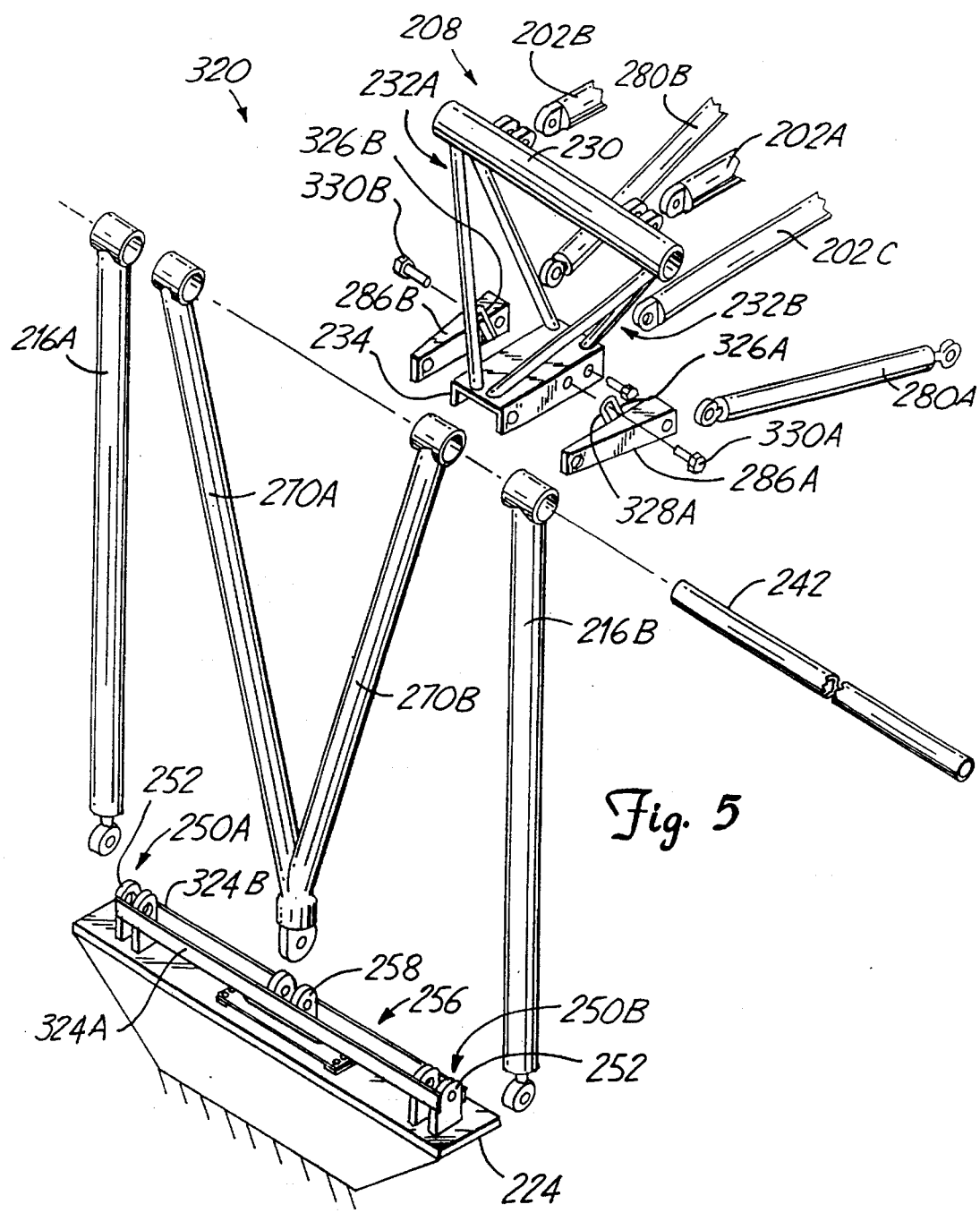
FIG. 5 is a perspective view of a second embodiment of a loading assembly of the present invention.

FIG. 5 illustrates another loading assembly 320. Like components of the loading assembly 320 that correspond to components of the loading assembly 200 have been similarly labeled. The loading assembly 320 applies lateral forces to the wheel adapter housing 16 using the frame assembly 208 as described above. The loading assembly 320, however, does not apply an active steer moment to the wheel adapter housing. Rather, support for the pivot shaft 242 is also provided by the struts 270A and 270B. In other words, the pivot shaft 242 is supported by the combination of struts 216A, 216B, 270A and 270B. The loading assembly 320 thus applies only passive or reactive steer moments to the wheel adaptor housing 16. If additional stiffness is required, stiffening plates 324A and 324B are fastened to the U-shaped support member 252 of the joint 250A, the U-shaped support member 258 of the joint 256 and the U-shaped support 252 of the joint 250B. The stiffening plates 324A and 324B can be used separately or together depending on the stiffness required. The stiffening plates 324A and 324B allow limited movement of the joints 250A, 250B and 256.

FIG. 5 further illustrates an alternative mechanism for adjusting the angular displacement of the pivot arms 286A and 286B with respect to the U-shaped support member 234. Referring to pivot arm 286A, a bracket 326A having a slot 328A formed therein is fastened to an inner surface of the pivoting arm 286A. A suitable fastener 330A adjustably secures the pivoting arm 286A at the selected angle with respect to the support member 234. A similar bracket 326B and fastener 330B are used to adjust the angular position of the pivoting arm 286B with respect to the support member 234.

Figure 6:
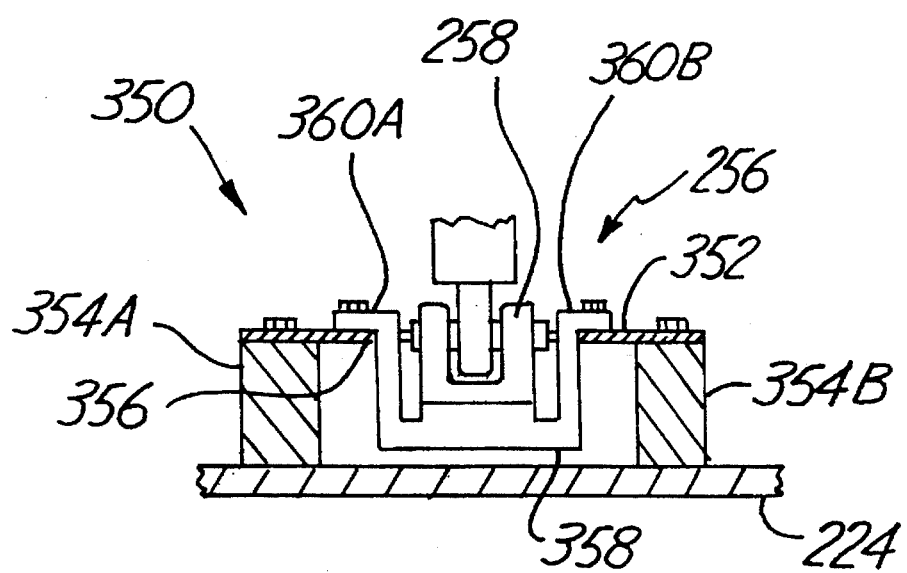
FIG. 6 is a sectional view of a second embodiment of a center mount.

FIG. 6 is similar to FIG. 2A and illustrates a second mounting assembly 350 for the joint 256. Mounting assembly 350 locates a flexible plate member 352 generally in the common plane defined by joints 250A, 250B and 256. The mounting assembly 350 includes spaced apart supports 354A and 354B that are secured to the cross support 224. The flexible plate member 352 is fastened to the supports 354A and 354B and includes a center aperture 356. The joint 256 has a base portion 358 that has outwardly extending flanges 360A and 360B. The flanges 360A and 360B are secured to the flexible plate 352 using suitable fasteners. The U-shaped support 258 of the joint 256 pivots on the support base 358.

Although the present invention has been described with reference to preferred embodiments, workers skilled in the art will recognize that changes may be made in form and detail without departing from the spirit and scope of the invention.

What is claimed is:

1. A loading assembly used in a vehicle spindle test fixture to apply a lateral force parallel to an axis of a vehicle spindle, the loading assembly comprising:

a support frame;

a wheel adapter housing mountable to the vehicle spindle;

a loading member pivotally joined to the support frame and spaced apart from the wheel adapter housing along the axis of the spindle;

a plurality of spaced apart struts connecting the loading member to the wheel adapter housing;

an actuator for applying a selected force; and connecting means for forming a pivot connection between the actuator and the loading member that is securable in one of a plurality of positions to emulate a selected rolling radius of a tire assembly mounted to the spindle.

2. The loading assembly of claim 1 and further comprising:

a second loading member pivotally joined to the support frame and operably joined to the first-mentioned loading member; and a second actuator joined to the second loading member, the second actuator displacing the second loading member so as to displace at least two struts of the plurality of struts in opposed directions.

3. The loading assembly of claim 2 and further comprising a pivot shaft joined to the support frame, the first-mentioned loading member and the second loading member pivoting on the pivot shaft.

4. The loading assembly of claim 2 and further comprising a third actuator joined to the second loading member, the third actuator displacing the second loading member so as to displace one of the struts of the plurality of struts relative to another strut of the plurality of struts.

5. The loading assembly of claim 4 wherein the plurality of struts equals three.

6. The loading assembly of claim 1 and further comprising:

a pivot shaft joined to the support frame, the loading member pivoting on the pivot shaft; and means for pivotally connecting the support frame to a fixed base.

7. The loading assembly of claim 6 wherein the support frame comprises at least two support struts and the means for pivotally connecting the support frame comprises a pivot connection formed on an end of each support strut opposite the pivot shaft wherein each pivot connection pivotally connects the corresponding support strut to the fixed base.

8. The loading assembly of claim 7 and wherein means for pivotally connecting the support frame further includes a third pivot connection disposed between the first-mentioned and second-mentioned pivot connections; and wherein the assembly further comprises a third and fourth strut joined together at the third pivot connection, the third strut being joined to a first end of the pivot shaft and the fourth strut being joined to a second end of the pivot shaft; and wherein the first mentioned loading frame is pivotally displaceable between the third and fourth struts.

9. The loading assembly of claim 8 and further comprising:

a fifth strut joined to the third pivot connection; and a second actuator joined to the fifth strut, the second actuator displacing the fifth strut so as to displace at least two struts of the plurality of struts in opposed directions.

10. The loading assembly of claim 9 and further comprising:

a sixth strut having a first end and a second end, the first end being joined to the fifth strut at an end opposite the third pivot connection and the second end being joined to the first end of the pivot shaft;

a seventh strut having a first end and a second end, the first end being joined to the fifth strut at the end opposite the third pivot connection and the second end being joined to the second end of the pivot shaft; and wherein the first-mentioned loading assembly is displaceable between the sixth and seventh struts.

11. A loading assembly used in a vehicle spindle test fixture to apply a lateral force parallel to an axis of a vehicle spindle and a steer moment to the vehicle spindle about an axis substantially perpendicular to the axis of the vehicle spindle and substantially perpendicular to a longitudinal axis of the vehicle, the loading assembly comprising:

a support frame;

a wheel adapter housing mountable to the vehicle spindle;

a first loading member pivotally joined to the support frame and spaced apart from the wheel adapter housing along the axis of the spindle;

a plurality of spaced apart struts connecting the first loading member to the wheel adapter housing;

a first actuator joined to the first loading member to displace the plurality of struts in a direction parallel to the spindle axis so as to apply a lateral force to the vehicle spindle;

a second loading member pivotally joined to the support frame and operably joined to the first loading member; and a second actuator joined to the second loading member, the second actuator displacing the second loading member so as to displace at least two struts of the plurality of struts connected to the first loading member in opposed directions so as to apply a steer moment to the vehicle spindle.

12. The loading assembly of claim 11 and further comprising a pivot shaft joined to the support frame, the first loading member and the second loading member pivoting on the pivot shaft.

13. The loading assembly of claim 12 and further comprising:

means for pivotally connecting the support frame to a fixed base.

14. The loading assembly of claim 13 wherein the support frame comprises two support struts and the means for pivotally connecting the support frame comprises a pivot connection formed on an end of each support strut opposite the pivot shaft wherein each pivot connection pivotally connects the corresponding support strut to the fixed base.

15. The loading assembly of claim 14 and wherein the means for pivotally connecting the support frame further includes a third pivot connection disposed between the first-mentioned and second-mentioned pivot connections; and wherein the second loading member comprises a first and second strut joined together at the third pivot connection, the first strut being joined to a first end of the pivot shaft and the second strut being joined to a second end of the pivot shaft; and wherein the first loading frame is pivotally displaceable between the first and second struts.

16. The loading assembly of claim 15 wherein the second loading assembly further comprises:

a third strut joined to the third pivot connection; and wherein the second actuator is joined to the third strut, the second actuator displacing the third strut so as to displace at least two struts of the plurality of struts in opposed directions.

17. The loading assembly of claim 16 wherein the second loading member further comprises:

a fourth strut having a first end and a second end, the first end being joined to the third strut at an end opposite the third pivot connection and the second end being joined to the first end of the pivot shaft;

a fifth strut having a first end and a second end, the first end being joined to the third strut at the end opposite the third pivot connection and the second end being joined to the second end of the pivot shaft; and wherein the first loading assembly is displaceable between the forth and fifth struts.

18. The loading assembly of claim 12 and further comprising a deflectable plate mounted to a fixed base and a pivot connection joining the second loading member to the deflectable plate.

19. The loading assembly of claim 18 wherein the support frame comprises two support struts and a strut pivot connection formed on an end of each support strut opposite the pivot shaft wherein each strut pivot connection pivotally connects the corresponding support strut to the fixed base, the assembly further comprising a stiffening plate connected to each of the strut pivot connections and the first-mentioned pivot connection.

20. The loading assembly of claim 11 and further comprising:

connecting means for forming a pivot connection between the actuator and the loading member that is securable in one of a plurality of positions to emulate a selected rolling radius of a tire assembly mounted to the spindle.

21. The loading assembly of claim 11 and further comprising a third actuator joined to the second loading member, the third actuator displacing the second loading member so as to displace one of the struts of the plurality of struts relative to another strut of the plurality of struts so as to apply a camber moment to the vehicle spindle about an axis that is parallel to the longitudinal axis of the vehicle.

22. The loading assembly of claim 21 wherein the plurality of struts equals three.

* * * * *

UNITED STATES PATENT AND TRADEMARK OFFICE
CERTIFICATE OF CORRECTION

PATENT NO. : 5,465,615
DATED : November 14, 1995
INVENTOR(S) : Petersen et al.

It is certified that error appears in the above-indentified patent and that said Letters Patent is hereby corrected as shown below:

Column 8, line 46, replace "frame" with --member--.

Column 8, line 66, replace "assembly" with --member--.

Column 10, line 21, replace "forth" with --fourth--.

Column 10, line 37, after "the" both occurrences add --first--.

Signed and Sealed this

Seventeenth Day of June, 1997

Attest:

Attesting Officer

BRUCE LEHMAN

Commissioner of Patents and Trademarks